(12) United States Patent
Ohmi

(10) Patent No.: US 9,550,243 B2
(45) Date of Patent: Jan. 24, 2017

(54) GEAR AND MANUFACTURING METHOD FOR THE SAME

(71) Applicant: ENPLAS CORPORATION, Saitama (JP)

(72) Inventor: Kenji Ohmi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 14/033,179

(22) Filed: Sep. 20, 2013

(65) Prior Publication Data

US 2014/0090503 A1 Apr. 3, 2014

(30) Foreign Application Priority Data

Sep. 21, 2012 (JP) ................................. 2012-207916
Oct. 4, 2012 (JP) ................................. 2012-222036

(51) Int. Cl.
*F16H 55/00* (2006.01)
*B23F 17/00* (2006.01)
*F16H 55/08* (2006.01)

(52) U.S. Cl.
CPC ......... *B23F 17/005* (2013.01); *F16H 55/0806* (2013.01); *Y10T 74/1987* (2015.01); *Y10T 409/101431* (2015.01)

(58) Field of Classification Search
CPC ...... F16H 55/08; F16H 55/17; F16H 55/0846; F16H 2055/0893; F16H 55/0813; F16H 1/145; F16H 55/12; F16H 55/0806; F16H 55/06; B22F 5/08; B22F 7/06; B23F 1/06; B23F 5/20; B23F 15/06

(Continued)

(56) References Cited

U.S. PATENT DOCUMENTS 2,422,326 A * 6/1947 Wildhaber ........................ 74/462
3,946,620 A * 3/1976 Yamamoto et al. ............. 74/462
(Continued)

FOREIGN PATENT DOCUMENTS

JP 2004-519644 A 7/2004
JP 2005-016646 A 1/2005
(Continued)

OTHER PUBLICATIONS

Partial English language translation of relevant portion of Japanese Office Action mailed Apr. 26, 2016, which issued in Japanese Patent Application No. 2012-222036.
(Continued)

*Primary Examiner* — William Kelleher
*Assistant Examiner* — Jake Cook
(74) *Attorney, Agent, or Firm* — McDermott Will & Emery LLP

(57) ABSTRACT

A gear includes teeth 3 to be engaged with teeth of a corresponding gear to transmit a rotational motion, in which a form (b) of a tooth root side of each tooth 3 includes: a first curved surface c which smoothly connects with a tooth surface a having an involute curve and has a profile represented by a curve which is convex in a direction opposite to the involute curve of the tooth surface a; and a second curved surface d which smoothly connects with the first curved surface c and has a profile defined by a quadratic function having a curve being convex in the same direction as that of the first curved surface c. Therefore, a stress generated on the tooth root side at the time of engagement with the teeth of the corresponding gear can be reduced, and the strength of the teeth can be increased.

7 Claims, 13 Drawing Sheets

(58) Field of Classification Search
USPC .................. 74/457, 459.5, 460, 462, 434
See application file for complete search history.

(56) References Cited

U.S. PATENT DOCUMENTS

| | | | |
|---|---|---|---|
| 5,271,289 A * | 12/1993 | Baxter, Jr. | 74/462 |
| 5,454,702 A * | 10/1995 | Weidhass | 418/206.5 |
| 6,080,199 A * | 6/2000 | Umeyama et al. | 703/1 |
| 6,205,879 B1 * | 3/2001 | Litvin et al. | 74/457 |
| 6,571,655 B2 * | 6/2003 | Tanaka | 74/462 |
| 7,111,395 B2 * | 9/2006 | Sandner | 29/893.3 |
| 7,178,420 B2 * | 2/2007 | Barth | 74/459.5 |
| 7,849,758 B2 * | 12/2010 | Katz | 74/462 |
| 7,950,305 B2 * | 5/2011 | Gutmann et al. | 74/457 |
| 8,201,471 B2 * | 6/2012 | Ohmi et al. | 74/462 |
| 8,246,333 B2 * | 8/2012 | Ju et al. | 418/201.3 |
| 8,381,608 B2 * | 2/2013 | Okamoto | 74/462 |
| 8,424,408 B2 * | 4/2013 | Zsolt et al. | 74/457 |
| 2004/0025346 A1 | 2/2004 | Barth | |
| 2008/0170960 A1 * | 7/2008 | Kotthoff et al. | 419/69 |
| 2011/0219898 A1 * | 9/2011 | Miura | 74/458 |
| 2014/0193195 A1 | 7/2014 | Merz | |

FOREIGN PATENT DOCUMENTS

| | | |
|---|---|---|
| JP | 2010-281441 A | 12/2010 |
| JP | 2014-519986 A | 8/2014 |
| WO | WO-2012/175719 A1 | 12/2012 |

OTHER PUBLICATIONS

Partial English language translation of relevant portion of Japanese Office Action mailed Jun. 7, 2016, which issued in Japanese Patent Application No. 2012-207916.

* cited by examiner

GEAR AND MANUFACTURING METHOD FOR THE SAME

BACKGROUND OF THE INVENTION

1. Field of the Invention

The present invention relates to a gear including a plurality of teeth to be engaged with teeth of a corresponding gear to thereby transmit a rotational motion between two shafts, and in particular, relates to a gear having a tooth profile that can reduce a stress generated on a tooth root side at the time of engagement with teeth of a corresponding gear and can increase a strength of teeth of the gear, and relates to a manufacturing method therefor.

2. Description of Related Art

Conventionally, numerous attempts have been made to increase a strength of teeth of a gear used in a power transmission mechanism, such as in an automobile, a precision machine, and the like.

This kind of gear includes a ring gear with teeth and tooth spaces, in which the teeth can be brought into engagement with a corresponding gear (pinion) via tooth flanks, in which the tooth flanks, after a final engagement point of the pinion, from a tooth top toward a tooth bottom, compared to standard tooth flanks, are made to approximate a trochoid, described by the pinion and projected into a normal section, the tooth spaces being embodied in cross section in the form of a pointed arch in the region of the tooth bottom (see, Published Japanese Translation of PCT Publication for Patent Application No. 2004-519644, for example).

However, in the gear disclosed in Published Japanese Translation of PCT Publication for Patent Application No. 2004-519644, since the tooth space between adjacent teeth is embodied when viewed in cross section in the form of the pointed arch in the region of the tooth bottom, a triangular-pointed recess hole is formed in the tooth bottom. In such a gear, a stress might tend to be concentrated to the recess hole of the tooth bottom during the engagement with the teeth of the corresponding gear, and accordingly, damage might be caused by the increased stress generated thereon. Thus, it is required to increase the strength of the entirety of the teeth, including the tooth bottoms.

Therefore, in view of the above problems, an object of the present invention is to provide a gear having a tooth profile that can reduce the stress generated on the tooth root side at the time of engagement with the teeth of the corresponding gear and can increase the strength of the teeth, and to provide a manufacturing method therefor.

SUMMARY OF THE INVENTION

In order to achieve the above object, a gear according to the first aspect includes a plurality of teeth to be engaged with teeth of a corresponding gear to thereby transmit a rotational motion, in which a form of a tooth root side of each of the plurality of teeth includes: a first curved surface which smoothly connects with a tooth surface having an involute curve and has a profile represented by a curve which is convex in a direction opposite to the involute curve of the tooth surface; and a second curved surface which smoothly connects with the first curved surface and has a profile defined by a quadratic function having a curve being convex in the same direction as that of the first curved surface.

The profile of the second curved surface, when viewed in a tooth perpendicular section thereof, may be a curve with a curvature radius which does not interfere with a locus of motion of the engaged teeth of the corresponding gear.

The profile of the first curved surface, when viewed in a tooth perpendicular section thereof, may be a spline curve which follows along an arc with a curvature radius which does not interfere with a locus of motion of the engaged teeth of the corresponding gear or along an interference region of the locus of motion.

According to the gear of the first aspect, since the form of the tooth root side of each of the plurality of teeth includes: the first curved surface which smoothly connects with the tooth surface having the involute curve and has the profile represented by the curve which is convex in the direction opposite to the involute curve of the tooth surface; and the second curved surface which smoothly connects with the first curved surface and has the profile defined by the quadratic function having the curve being convex in the same direction as that of the first curved surface, the curved surface defined by the quadratic function can be formed without forming the triangular-pointed recess hole in the tooth bottom. Thus, the stress can be not readily concentrated on the tooth root side, the stress generated on the tooth root side at the time of engagement with the teeth of the corresponding gear can be reduced, and the strength of the teeth can be increased. Accordingly, long-term durability of the teeth can be improved.

Furthermore, a gear according to the second aspect includes a plurality of teeth to be engaged with teeth of a corresponding gear to thereby transmit a rotational motion, in which a form of a tooth root side of each of the plurality of teeth is identical to a form shaped by a gear-generation with a rack-type cutter having a blade edge including a round portion with a curve defined by a quadratic function.

According to the gear of the second aspect, the form of the tooth root side of each of the plurality of teeth can be identical to the form shaped by the gear-generation with the rack-type cutter having the blade edge including the round portion with the curve defined by the quadratic function, without forming the triangular-pointed recess hole in the tooth bottom. Thus, the stress can be not readily concentrated on the tooth root side, the stress generated on the tooth root side at the time of engagement with the teeth of the corresponding gear can be reduced, and the strength of the teeth can be increased. Accordingly, long-term durability of the teeth can be improved.

Furthermore, a manufacturing method of the gear according to the second aspect is a manufacturing method of a gear including a plurality of teeth to be engaged with teeth of a corresponding gear to thereby transmit a rotational motion, the method including the step of: forming a tooth root side of each of the plurality of teeth to a form identical to a form shaped by a gear-generation with a rack-type cutter having a blade edge including a round portion with a curve defined by a quadratic function.

In the manufacturing method of the gear, the gear may be made of metal, and the tooth root side of each of the plurality of teeth may be subjected to the gear-generation with the rack-type cutter having the blade edge including the round portion with the curve defined by the quadratic function.

In the manufacturing method of the gear, the gear may be made of resin, and the gear may be injection-molded by using a gear piece formed based on a gear in which the tooth root side of each of the plurality of teeth is subjected to the gear-generation with the rack-type cutter having the blade edge including the round portion of the curve defined by the quadratic function.

According to the manufacturing method of the gear of the second aspect, the form of the tooth root side of each of the plurality of teeth can be identical to the form shaped by the gear-generation with the rack-type cutter having the blade edge including the round portion with the curve defined by the quadratic function, without forming the triangular-pointed recess hole in the tooth bottom. Thus, the stress can be not readily concentrated on the tooth root side, the stress generated on the tooth root side at the time of engagement with the teeth of the corresponding gear can be reduced, and the strength of the teeth can be increased. Accordingly, long-term durability of the teeth can be improved.

DESCRIPTION OF THE PREFERRED EMBODIMENTS

Hereunder, embodiments of the present invention will be described with reference to the accompanying drawings.

Figure 1:
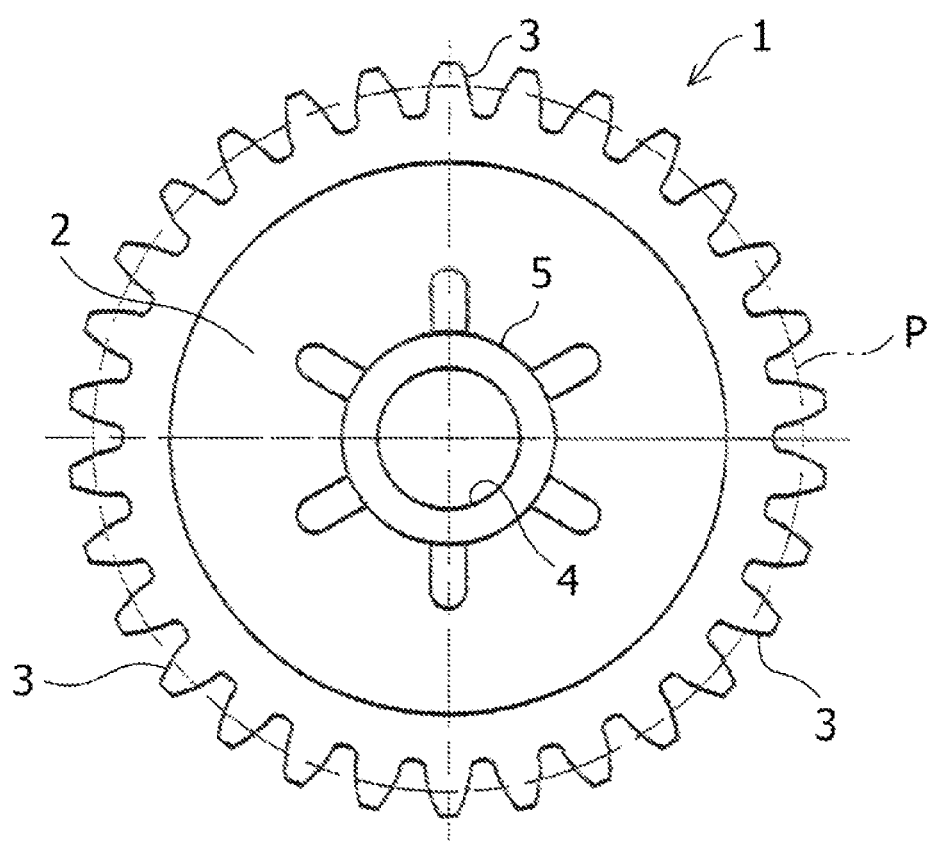
FIG. 1 is a front view illustrating an entire form of a gear according to the present invention.

FIG. 1 is a front view illustrating an entire form of a gear according to the present invention. Such a gear includes a plurality of teeth to be engaged with teeth of a corresponding gear to thereby transmit a rotational motion between two shafts, and is widely used in a power transmission mechanism, such as an automobile, a precision machine, an industrial machine, and a component thereof, and the like.

In FIG. 1, a gear 1 is provided with a plurality of teeth 3, 3, . . . formed on the outer peripheral side of a web 2 of substantially circular plate shape, and a boss 5 through which a shaft hole 4 for fixing therein a rotating shaft is bored is formed at the central portion of the web 2, so that the gear 1 transmits a rotational motion between two shafts. Here, the reference symbol P indicates a pitch circle of the gear 1.

Figure 2:
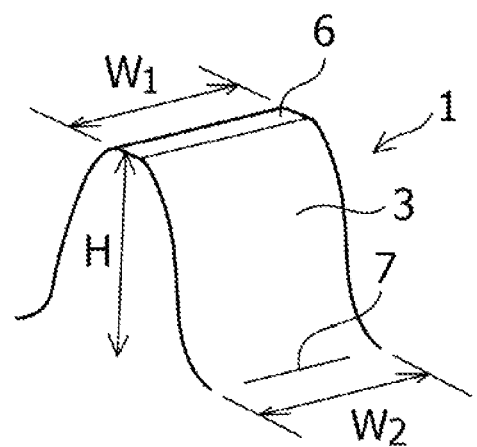
FIG. 2 is a perspective view illustrating a tooth profile of a standard gear.

In general, as illustrated in FIG. 2, the teeth 3 of the gear 1 are formed to have a tooth profile of a standard gear, which includes a tooth surface having an involute curve and is symmetric. That is, in each tooth 3, a tooth width $W_1$ of a tooth top surface 6 thereof and a tooth width $W_2$ of a tooth bottom surface 7 (which is the lowest bottom surface in a tooth space which is between the adjacent teeth 3, 3) have the same size, and a whole depth H is constant in a tooth width direction.

Figure 3:
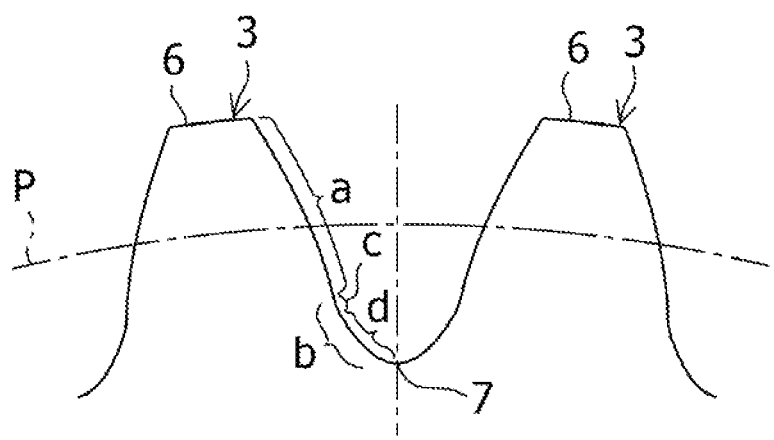
FIG. 3 is an enlarged explanatory view illustrating a profile of teeth of a gear according to the first embodiment.

FIG. 3 is an enlarged explanatory view illustrating a profile of the teeth 3 of the gear 1 according to the first embodiment. In FIG. 3, in a side face of the tooth 3, a tooth surface a is provided, and a tooth surface b is provided on a tooth root side with respect to the tooth surface a. The tooth 3 of the gear 1 according to the first embodiment is provided with an advantageous profile on the tooth root side with respect to the tooth surface a, and thus, as illustrated in FIG. 3, the tooth surface b which is on the tooth root side of each tooth 3 includes a first curved surface c and a second curved surface d.

That is, the first curved surface c smoothly connects with the tooth surface a having the involute curve, and has a profile represented by a curve which is convex in a direction opposite to the involute curve of the tooth surface a.

Furthermore, the second curved surface d smoothly connects with the first curved surface c and has a profile defined by a quadratic function having a curve being convex in the same direction as that of the first curved surface c. Such a quadratic function may be expressed by $y=kx^2$, wherein k is a coefficient.

Figure 4:
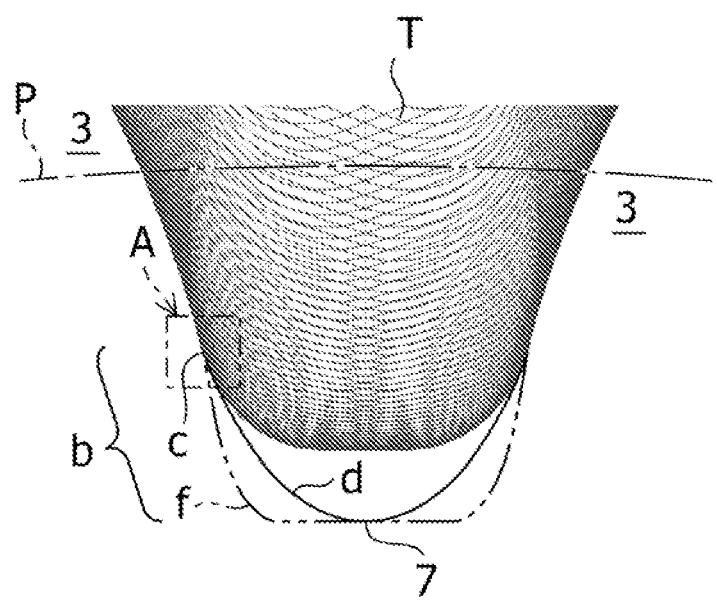
FIG. 4 is an explanatory view illustrating a locus of motion of a tooth surface on a tooth top side of a corresponding gear which is brought into contact with the teeth of the gear according to the first embodiment at the time of engagement.

Such a tooth profile may be set as follows. First, in FIG. 4, when viewed in a cross section of the tooth 3 perpendicular to the tooth surface width direction of the tooth 3 (referred to as "a tooth perpendicular section"), the profile of the second curved surface d is set to be a curve with a curvature radius which does not interfere with a locus of motion of the engaged teeth of the corresponding gear, and a curve which is in contact with the tooth bottom surface 7 of the above-mentioned standard gear (see, FIG. 2). That is, the locus of motion of a tooth surface on a tooth top side of the corresponding gear (not shown) which is brought into contact with the teeth 3 of the gear at the time of engagement can be a trochoid curve T as illustrated in FIG. 4. This trochoid curve T remains within a region which does not reach the tooth bottom surface 7 in the tooth space between the teeth 3, 3 of the standard gear. In this state, the profile may be set to be a curve with the curvature radius which does not interfere with the trochoid curve T, which is the locus of motion of the teeth of the corresponding gear, and to be a curve defined by a quadratic function having a curve which is in contact with the tooth bottom surface 7 of the above-mentioned standard gear. In this case, the second curved surface d is formed to have a profile locating inside the tooth surface profile of the tooth root side of the standard gear as indicated by a broken line f in FIG. 4, and accordingly, a tooth thickness on the tooth root side increases compared to the conventional one. In addition, the triangular-pointed recess hole as disclosed in the above-mentioned Published Japanese Translation of PCT Publication for Patent Application No. 2004-519644 is not formed on the tooth bottom surface 7 of the gear. In FIG. 4, the profile of the second curved surface d defined by the quadratic function is set to be the curve which is in contact with the tooth bottom surface 7 of the standard gear. However, the first embodiment is not limited to this, and the curve may be set to any position which does not interfere with the locus of motion of the teeth of the corresponding gear. For example, if the curve is set to be a position above the tooth bottom surface 7 of the above-mentioned standard gear, the strength of the teeth may be further increased thereby.

Figure 5:
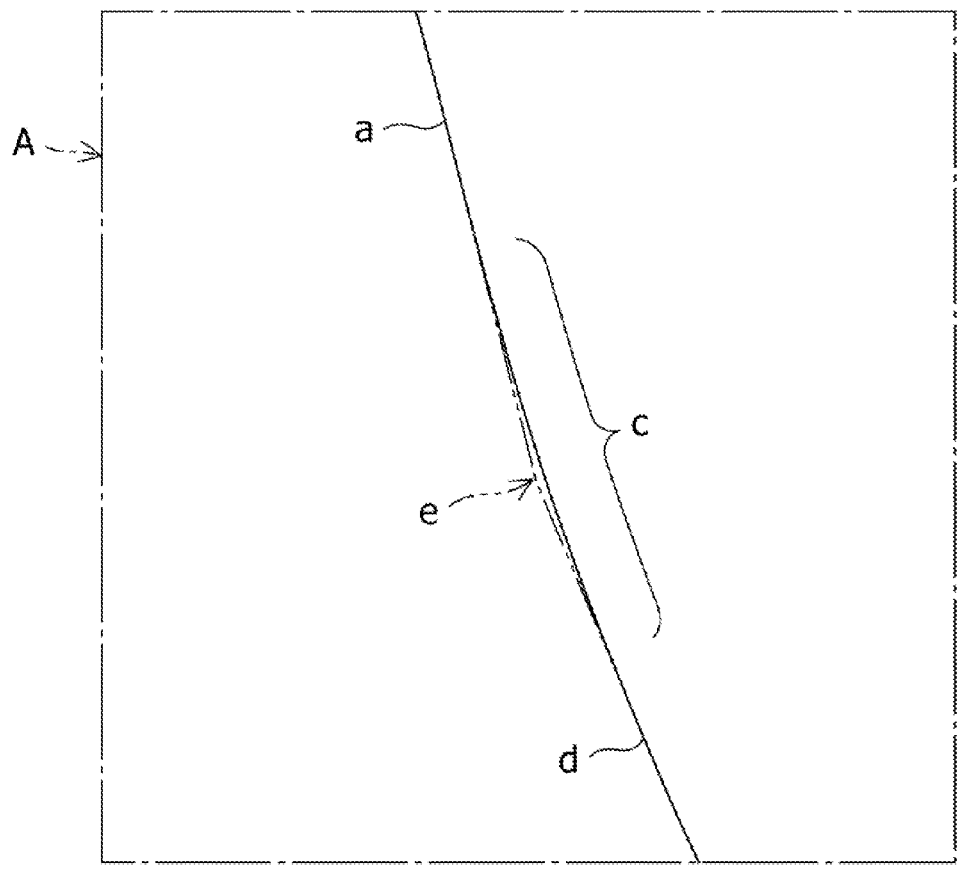
FIG. 5 is an explanatory view illustrating a profile of the A-portion of FIG. 4 in more detail.

Next, in FIG. 4, the profile of the first curved surface c, when viewed in the tooth perpendicular section thereof, is set to a spline curve which follows along an arc with a curvature radius which does not interfere with a locus of motion of the engaged teeth of the corresponding gear or along an interference region of the locus of motion. A detailed profile of the A-portion of FIG. 4 is illustrated in FIG. 5. In FIG. 5, at a point at which the tooth surface a intersects the curved surface d, there may be an edge e at which the curved profile of the tooth surface a having the involute curve meets the curved profile (curved in a direction opposite to that of the tooth surface a) of the second curved surface d defined by the quadratic function. If there is formed the edge e, the stress might be easily concentrated thereon. Thus, to eliminate the edge e, the profile of the first curved surface c may be set to the spline curve which follows along the arc with the curvature radius which does not interfere with the trochoid curve T, which is the locus of motion of the teeth of the corresponding gear, or along the interference region of the trochoid curve T, as mentioned above. In this case, the first curved surface c is formed as a smooth tooth surface on which the edge e is not formed, that is, the first curved surface c smoothly connects with the tooth surface a having the involute curve and has the profile represented by the curve which is convex in the direction opposite to the involute curve of the tooth surface a. Thus, the tooth profile in which the concentration of stress due to the edge e does not occur can be achieved.

Regarding the gear 1 according to the first embodiment having the tooth profile set as described above, results obtained by computer-aided simulating and analyzing (CAE) the stress generated on the tooth root side at the time of engagement will be described. Here, as a comparative gear, a gear with the tooth profile of the standard gear, in which the gear is subjected to a gear-generation with a rack having a blade edge including a round portion defined by an arc (hereinafter, referred to as "first comparative gear") is used.

First, a computation model for computing a tooth root stress in this simulation and an analysis condition will be described. The gear according to the first embodiment and the first comparative gear, used in this analysis, were spur gears, in which the module (m) was 1, and the number of teeth was 30. The material was resin (POM), in which the Young's modulus was 2800 MPa, and the Poisson's ratio was approximately 0.38. The corresponding gear to be engaged therewith had the same specifications as that of the gear according to the first embodiment and the first comparative gear. As a load condition, a load applied to the worst loading point in a direction of a normal line of tooth surface was 10 N. As an analytic model, a shell meshing model with only one tooth extracted was used in the analysis. As a computation software for computing the tooth root stress, "SolidWorks" was used.

Figure 6:
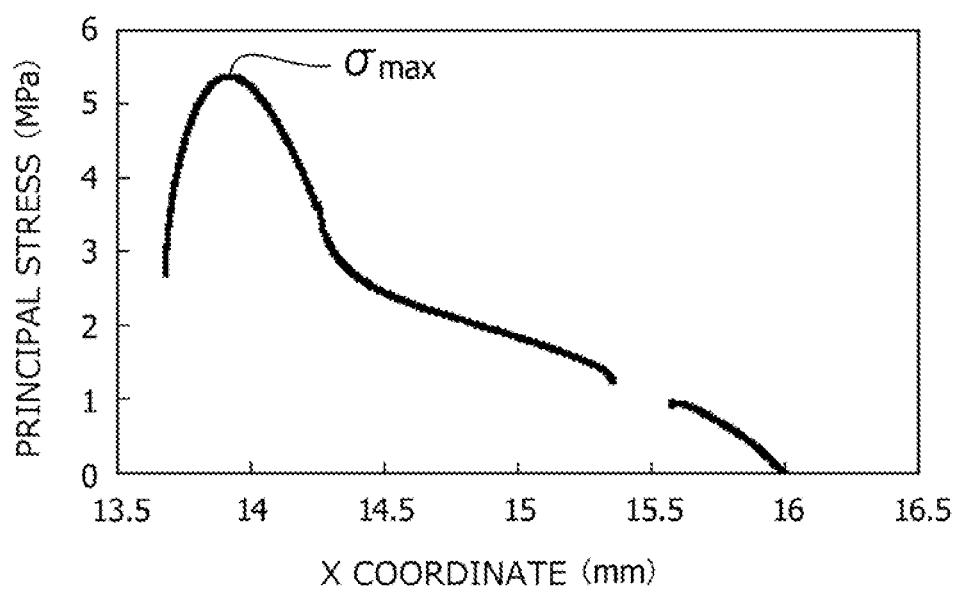
FIG. 6 is a graph illustrating a stress distribution obtained by simulating and analyzing a first comparative gear.

First, a stress distribution of the tooth root stress obtained by analyzing the first comparative gear is illustrated in FIG. 6. In FIG. 6, the horizontal axis represents X coordinate (mm) in a whole depth direction, in which the right side of the coordinates represents a tooth top side and the left side represents a tooth bottom side. The origin of the horizontal axis is a center of the gear (center of the shaft hole 4). The vertical axis represents a magnitude of a generated principal stress (MPa). In this first comparative gear, as illustrated in FIG. 6, the principal stress gradually increases from the tooth top side to the tooth bottom side, and suddenly increases at approximately 14.3 mm of the X coordinate, and then the maximum principal stress $\sigma max$ reaches 5.39 MPa.

Figure 7:
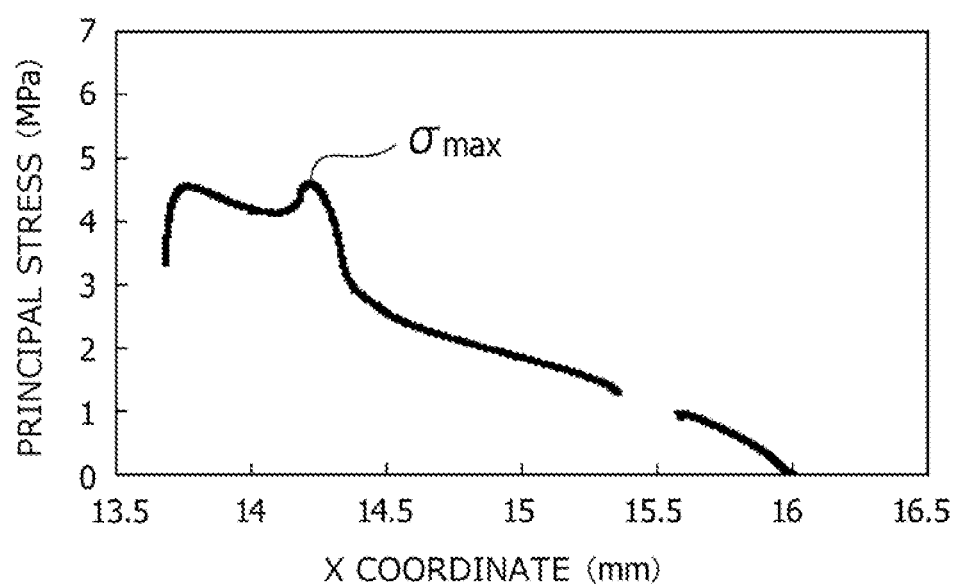
FIG. 7 is a graph illustrating a stress distribution obtained by simulating and analyzing the gear according to the first embodiment.

Next, a stress distribution of the tooth root stress obtained by analyzing the gear according to the first embodiment is illustrated in FIG. 7. In FIG. 7, the horizontal axis and the vertical axis represent the X coordinate (mm) in the whole depth direction and the magnitude of the generated principal stress (MPa), respectively, similarly to FIG. 6. In the gear according to the first embodiment, as illustrated in FIG. 7, although the principal stress also gradually increases from the tooth top to the tooth bottom and increases at approximately 14.3 mm of the X coordinate, the maximum principal stress $\sigma max$ is 4.6 MPa. In this case, a position at which the principal stress suddenly increases is substantially the same as that of the first comparative gear. Furthermore, the state of the sudden increase is also substantially the same as that of the first comparative gear. However, in the gear according to the first embodiment, the maximum principal stress $\sigma max$ is less than that of the first comparative gear (a decrease of approximately 14%). Furthermore, when viewing the stress distribution on the tooth root side, there is indicated a convex distribution having one peak (maximum value) in the first comparative gear, and there is indicated a pattern in which the stress is widely distributed (planarized) in the gear according to the first embodiment, and thus it is considered that the maximum principal stress is decreased thereby.

As is apparent from the above analysis results of the simulation, according to the tooth profile of the gear of the first embodiment, the stress generated on the tooth root side at the time of engagement with the teeth of the corresponding gear can be reduced, and the strength of the teeth can be increased. Accordingly, the long-term durability of the teeth can be improved.

Furthermore, according to the gear of the first embodiment, since the profile on the tooth root side is formed as the curved surface defined by the quadratic function, the stress can be not readily concentrated on the tooth root side, compared to the conventional gear in which the triangular-pointed recess hole is formed in the tooth bottom.

Figure 8:
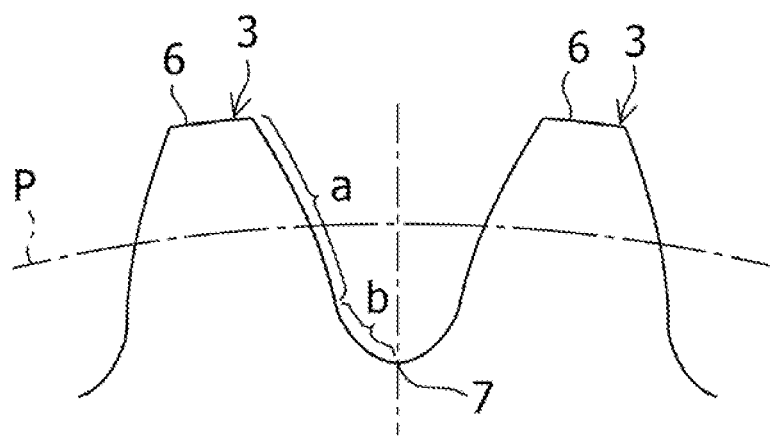
FIG. 8 is an enlarged explanatory view illustrating a profile of teeth of a gear according to the second embodiment.

FIG. 8 is an enlarged explanatory view illustrating a profile of teeth 3 of a gear 1 according to the second embodiment. In FIG. 8, in a side face of the tooth 3, a tooth surface a is provided, and a tooth surface b is provided on a tooth root side with respect to the tooth surface a. The tooth 3 of the gear 1 according to the second embodiment is provided with an advantageous profile on the tooth root side with respect to the tooth surface a, and thus, as illustrated in FIG. 8, a form of the tooth surface b which is on the tooth root side of each tooth 3 is identical to a form shaped by a gear-generation with a rack-type cutter having a blade edge including a round portion with a curve defined by a quadratic function. In particular, a portion which is connect with the tooth bottom surface 7 (see, FIG. 2) is formed as a concave curved surface.

This concave curved surface (b) smoothly connects with the tooth surface a having an involute curve and has a profile represented by a curve which is convex in a direction opposite to the involute curve of the tooth surface a. The gear 1 having such a tooth root side profile may be a metal gear which is manufactured by cutting a metal material or metal materials, or may be a resin gear which is manufactured by injection-molding a resin or resins.

Figure 9:
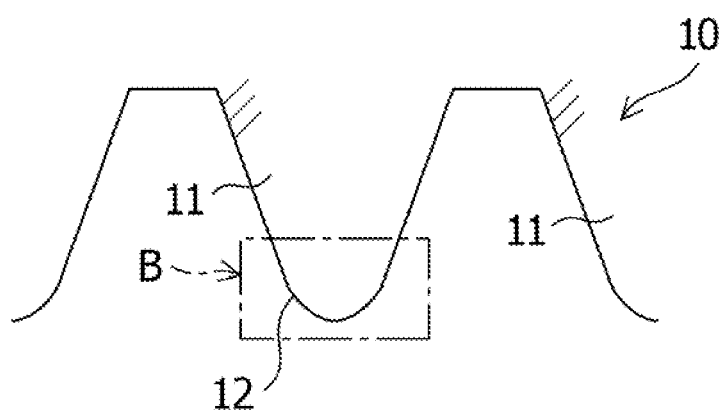
FIG. 9 is an explanatory view illustrating a rack-type cutter having a blade edge including a round portion with a curve defined by a quadratic function.

Here, to manufacture the gear 1 having the tooth profile illustrated in FIG. 8, a tooth root side of each of the plurality of teeth 3 may be formed to the form identical to the form shaped by the gear-generation with the rack-type cutter having the blade edge including the round portion with the curve defined by the quadratic function. As illustrated in FIG. 9, a rack-type cutter 10 used herein has a blade edge 12 of a blade 11 thereof, the blade edge 12 including a round portion with a curve defined by a quadratic function. Such a quadratic function may be expressed by $y=kx^2$, wherein k is a coefficient.

Figure 10:
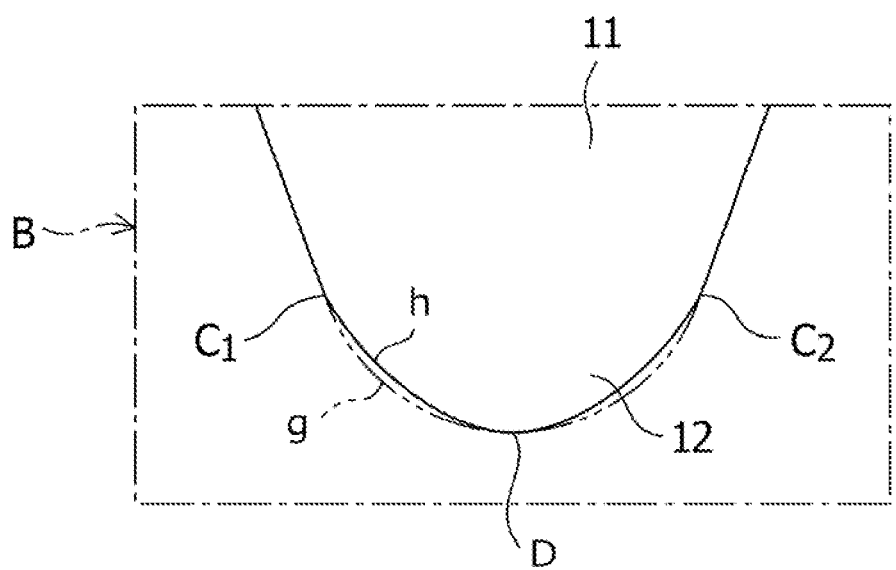
FIG. 10 is an explanatory view illustrating a profile of the B-portion of FIG. 9 in more detail.

In FIG. 10, a detailed profile of the B-portion of FIG. 9 is illustrated. Referring to FIG. 10, in general, the blade 11 of the rack-type cutter 10 has a portion of the blade edge 12 formed as an arc when a gear having a high tooth-root strength is manufactured by the gear-generation in a general gear design. That is, a portion defined by points $C_1$, D, $C_2$ of the blade edge 12 is formed as an arc g having a predetermined radius (conventional example). On the other hand, the blade 11 of the rack-type cutter 10 used to manufacture the gear 1 according to the second embodiment has a portion defined by points $C_1$, D, $C_2$ of the blade edge 12 as illustrated in FIG. 10 replaced with a round portion represented by a curve h defined by the quadratic function. In this case, the curve h defined by the quadratic function is located inside the arc g of the conventional example, and accordingly, the blade edge 12 becomes slightly narrow. The gear 1 which is subjected to the gear-generation with the rack-type cutter 10 having such blade edge 12 has a greater tooth thickness on the tooth root side than that of the gear subjected to the gear-generation with the conventional rack-type cutter having the blade edge 12 formed as the arc g. In FIG. 10, although the portion defined by the points $C_1$, D, $C_2$ is replaced with the curve h defined by the quadratic function, the positions of the left-and-right curve starting points (or connection points) $C_1$, $C_2$ may be set at any positions within a range which does not interfere with a locus of motion of the engaged teeth of the corresponding gear.

Figure 11:
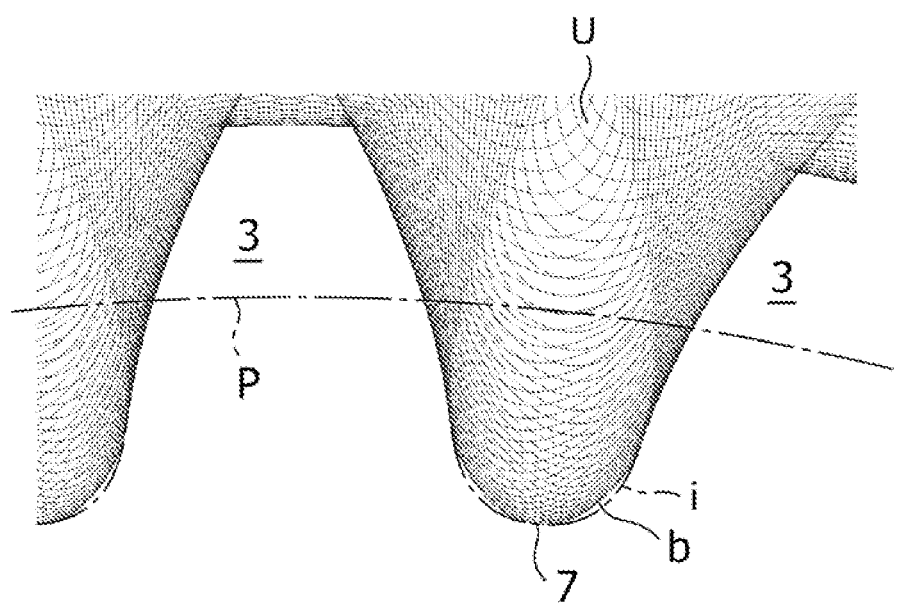
FIG. 11 is an explanatory view illustrating a locus of motion of the blade edge when a gear-generation is carried out with the rack-type cutter of FIG. 9.

FIG. 11 is an explanatory view illustrating the locus of motion of the blade edge 12 when the gear-generation is carried out with the rack-type cutter 10 of FIG. 9. In this case, there is illustrated a configuration in that the gear 1 is manufactured in which the gear 1 is made of metal, and in which the tooth root side of each of the plurality of teeth 3 is subjected to the gear-generation with the rack-type cutter 10 having the blade edge 12 including the round portion with the curve defined by the quadratic function. The locus of motion of the blade edge 12 when the gear-generation is carried out by bringing the blade 11 of the rack-type cutter 10 into contact with the material of the gear 1 can be obtained as a curve U as illustrated in FIG. 11. This curve U is in a condition in which the top thereof is in contact with the tooth bottom surface 7 in the tooth space which is between the teeth 3, 3 of the standard gear. Accordingly, the profile of the concave curved surface (b) of FIG. 8 is located inside the profile of the tooth surface on the tooth root side of the standard gear, which is indicated by a chain line in FIG. 11, and thus, the tooth thickness on the tooth root side can be greater than that in the conventional example. Furthermore, on the tooth bottom surface 7 of the gear, the triangular-pointed recess hole as disclosed in the above-mentioned Published Japanese Translation of PCT Publication for Patent Application No. 2004-519644 is not formed. In FIG. 11, the profile of the concave curved surface (b) is formed as the curve which is in contact with the tooth bottom surface 7 of the standard gear. However, the second embodiment is not limited to this, and the curve may be set to any position which does not interfere with the locus of motion of the teeth of the corresponding gear. For example, if the curve is set to be a position above the tooth bottom surface 7 of the above-mentioned standard gear, the strength of the teeth may be further increased thereby.

The above description is given for the case in which the metal gear is manufactured. However, the second embodiment is not limited to this. The gear 1 may be made of resin, and the resin gear may be manufactured by an injection-molding by using a gear piece (mold) formed based on a gear in which the tooth root side of each of the plurality of teeth 3 is subjected to the gear-generation with the rack-type cutter 10 having the blade edge 12 including the round portion of the curve defined by the quadratic function. In manufacturing the gear piece, the metal gear which is obtained by the gear-generation with the above-mentioned rack-type cutter 10 may be used as an electrode, to manufacture the gear piece by an electrical discharge machining. Alternatively, the gear piece may be manufactured by conventionally known methods other than the electrical discharge machining.

Regarding the gear 1 according to the second embodiment having the tooth profile set as described above, results obtained by a computer-aided simulating and analyzing (CAE) the stress generated on the tooth root side at the time of engagement will be described. Here, as a comparative gear, a gear with the tooth profile of the standard gear, in which the gear is subjected to a gear-generation with a rack-type cutter having a blade edge including a round portion defined by an arc (hereinafter, referred to as "second comparative gear") is used.

First, a computation model for computing a tooth root stress in this simulation and an analysis condition will be described. The gear according to the second embodiment and the second comparative gear, used in this analysis, were spur gears, in which the module (m) was 1, and the number of teeth was 30. The material was resin (POM), in which the Young's modulus was 2800 MPa, and the Poisson's ratio was approximately 0.38. The corresponding gear to be engaged therewith had the same specifications as that of the gear according to the second embodiment and the second comparative gear. As a load condition, a load applied to the worst loading point in a direction of a normal line of tooth surface was 10 N. As an analytic model, a shell meshing model with only one tooth extracted was used in the analysis. As a computation software for computing the tooth bottom stress, "SolidWorks" was used.

Figure 12:
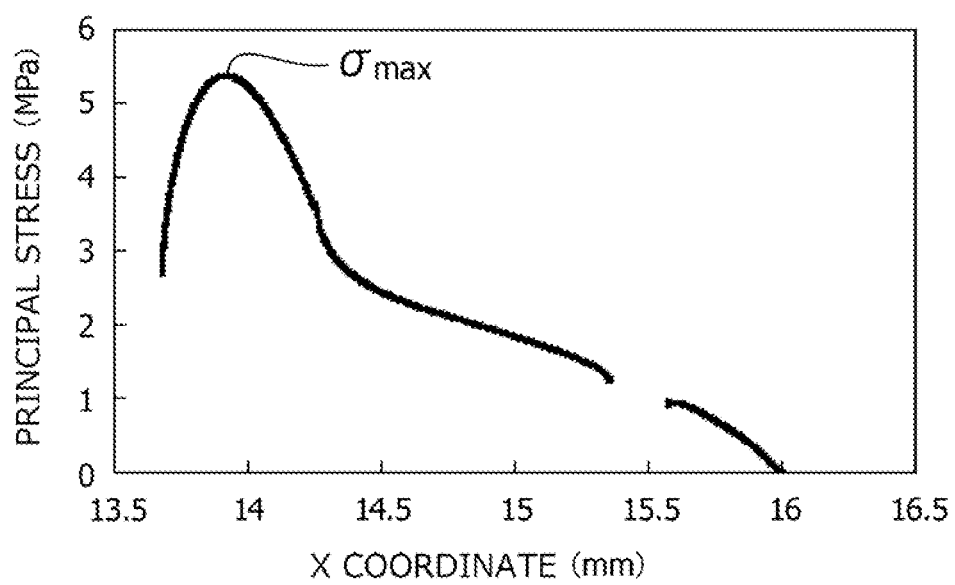
FIG. 12 is a graph illustrating a stress distribution obtained by simulating and analyzing a second comparative gear.

First, a stress distribution of the tooth root stress obtained by analyzing the second comparative gear is illustrated in FIG. 12. In FIG. 12, the horizontal axis represents X coordinate (mm) in a whole depth direction, in which the right side of the coordinates represents a tooth top side and the left side represents a tooth bottom side. The origin of the horizontal axis is a center of the gear (center of the shaft hole 4). The vertical axis represents a magnitude of a generated principal stress (MPa). In this second comparative gear, as illustrated in FIG. 12, the principal stress gradually increases from the tooth top side to the tooth bottom side, and suddenly increases at approximately 14.3 mm of the X coordinate, and then the maximum principal stress σmax reaches 5.39 MPa.

Figure 13:
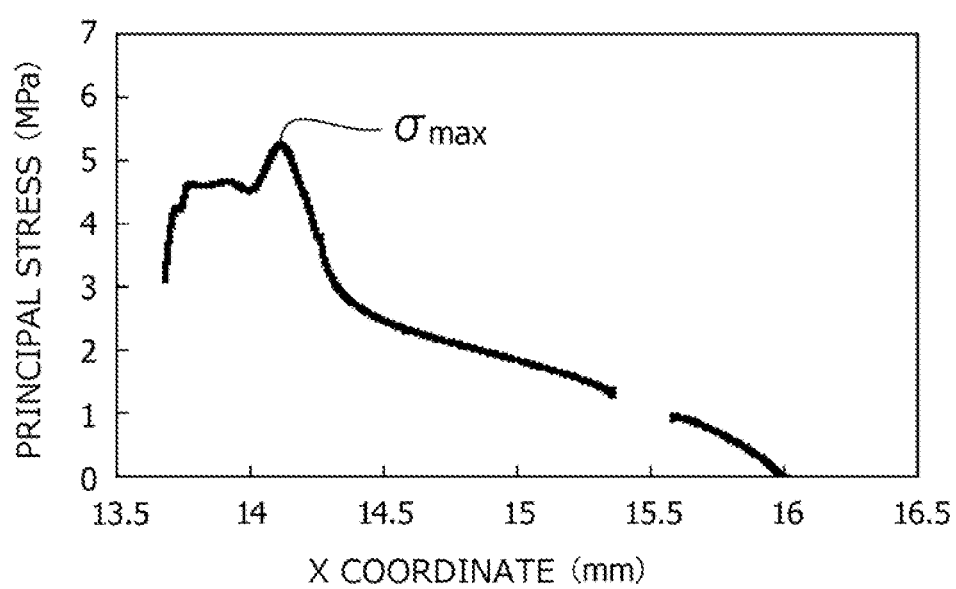
FIG. 13 is a graph illustrating a stress distribution obtained by simulating and analyzing the gear according to the second embodiment.

Next, a stress distribution of the tooth root stress obtained by analyzing the gear according to the second embodiment is illustrated in FIG. 13. In FIG. 13, the horizontal axis and the vertical axis represent the X coordinate (mm) in the whole depth direction and the magnitude of the generated principal stress (MPa), respectively, similarly to FIG. 12. In the gear according to the second embodiment, as illustrated in FIG. 13, although the principal stress also gradually increases from the tooth top to the tooth bottom and increases at approximately 14.3 mm of the X coordinate, the maximum principal stress σmax is 5.25 MPa. In this case, a position at which the principal stress suddenly increases is substantially the same as that of the second comparative gear. Furthermore, the state of the sudden increase is also substantially the same as that of the second comparative gear. However, in the gear according to the second embodiment, the maximum principal stress σmax is less than that of the first comparative gear (a decrease of approximately 3%). Furthermore, when viewing the stress distribution on the tooth root side, there is indicated a convex distribution having one peak (maximum value) in the second comparative gear, and there is indicated a pattern in which the stress is widely distributed (planarized) in the gear according to the second embodiment, and thus it is considered that the maximum principal stress is decreased thereby.

As is apparent from the above analysis results of the simulation, according to the tooth profile of the gear of the second embodiment, the stress generated on the tooth root side at the time of engagement with the teeth of the corresponding gear can be reduced, and the strength of the teeth can be increased. Accordingly, the long-term durability of the teeth can be improved.

Furthermore, according to the gear of the second embodiment, in the form of the tooth root side of each of the plurality of teeth, the stress can be not readily concentrated on the tooth root side, compared to the conventional gear in which the triangular-pointed recess hole is formed in the tooth bottom.

In the above embodiments, the examples of the present invention are applied to the standard gear. However, the present invention is not limited to this. It should be understood that the present invention can be applied to a profile-shifted gear, for example.

Furthermore, the gear according to the embodiments of the present invention is not limited to the spur gear. The present invention may be widely applied to tooth profiles of other types of gears, such as a helical gear, a herringbone gear, a bevel gear, a face gear, a worm gear, a hypoid gear, and the like. Still further, the gear according to the embodiments of the present invention is not limited to a gear made of metal (for example, an alloy steel for machine construction, a carbon steel, a stainless steel, a brass, a phosphor bronze, and the like). The present invention may be applied to a gear made of resin.

It should be noted that the entire contents of Japanese Patent Application No. 2012-207916, filed on Sep. 21, 2012, and Japanese Patent Application No. 2012-222036, filed on Oct. 4, 2012, on which the convention priorities are claimed, are incorporated herein by reference.

It should also be understood that many modifications and variations of the described embodiments of the invention will occur to one of ordinary skill in the art without departing from the spirit and scope of the present invention as claimed in the appended claims.

What is claimed is:

1. A gear comprising a plurality of teeth to be engaged with teeth of a corresponding gear to thereby transmit a rotational motion, wherein each of the plurality of teeth comprises:
   a first tooth surface having an involute curve; and
   a second tooth surface on a tooth root side with respect to the first tooth surface, wherein the second tooth surface on the tooth root side of each of the plurality of teeth comprises:
      a first curved surface which smoothly connects with the first tooth surface having the involute curve and has a profile represented by a curve which is convex in a direction opposite to the involute curve of the tooth surface; and
      a second curved surface which smoothly connects with the first curved surface and has a profile defined by a quadratic function having a curve being convex in the same direction as that of the first curved surface, wherein the quadratic function is expressed by $y=kx^2$, wherein k is a coefficient.

2. The gear according to claim 1, wherein the profile of the second curved surface, when viewed in a tooth perpendicular section thereof, is a curve with a curvature radius which does not interfere with a locus of motion of the engaged teeth of the corresponding gear.

3. The gear according to claim 1 or claim 2, wherein the profile of the first curved surface, when viewed in a tooth perpendicular section thereof, is a spline curve which follows along an arc with a curvature radius which does not interfere with a locus of motion of the engaged teeth of the corresponding gear or along an interference region of the locus of motion.

4. A gear comprising a plurality of teeth to be engaged with teeth of a corresponding gear to thereby transmit a rotational motion, wherein each of the plurality of teeth comprises:
   a first tooth surface having an involute curve; and
   a second tooth surface on a tooth root side with respect to the first tooth surface, wherein the second tooth surface on the tooth root side of each of the plurality of teeth comprises:
      a first curved surface which smoothly connects with the first tooth surface having the involute curve and has a profile represented by a curve which is convex in a direction opposite to the involute curve of the tooth surface; and
      a second curved surface which smoothly connects with the first curved surface and which is identical to a form shaped by a gear-generation with a rack-type cutter having a blade edge including a round portion with a curve defined by a quadratic function, wherein the quadratic function is expressed by $y=kx^2$, wherein k is a coefficient, and wherein the second curved surface has a curve that is convex in the same direction as that of the first curved surface.

5. A manufacturing method of a gear comprising a plurality of teeth to be engaged with teeth of a corresponding gear to thereby transmit a rotational motion, the method comprising the step of:
   forming each of the plurality of teeth to comprise:
      a first tooth surface having an involute curve; and
      a second tooth surface on a tooth root side with respect to the first tooth surface, wherein the second tooth surface on the tooth root side of each of the plurality of teeth to a comprises:
         a first curved surface which smoothly connects with the first tooth surface having the involute curve and has a profile represented by a curve which is convex in a direction opposite to the involute curve of the tooth surface: and
         a second curved surface which smoothly connects with the first curved surface and which is identical to a form shaped by a gear-generation with a rack-type cutter having a blade edge including a round portion with a curve defined by a quadratic function, wherein the quadratic function is expressed by $y=kx^2$, wherein k is a coefficient and wherein the second curved surface has a curve that is convex in the same direction as that of the first curved surface.

6. The manufacturing method of the gear according to claim 5, wherein the gear is made of metal, and wherein the tooth root side of each of the plurality of teeth is subjected to the gear-generation with the rack-type cutter having the blade edge including the round portion with the curve defined by the quadratic function.

7. The manufacturing method of the gear according to claim 5, wherein the gear is made of resin, and wherein the gear is injection-molded by using a gear piece formed based on a gear in which the tooth root side of each of the plurality of teeth is subjected to the gear-generation with the rack-type cutter having the blade edge including the round portion of the curve defined by the quadratic function.

* * * * *

UNITED STATES PATENT AND TRADEMARK OFFICE
CERTIFICATE OF CORRECTION

PATENT NO. : 9,550,243 B2
APPLICATION NO. : 14/033179
DATED : January 24, 2017
INVENTOR(S) : Kenji Ohmi Page 1 of 1

It is certified that error appears in the above-identified patent and that said Letters Patent is hereby corrected as shown below:

In the Claims

In Column 10, Line 59-60:
Replace "plurality of teeth to a comprises" with --plurality of teeth comprises--.

In Column 11, Line 5:
Replace "k is a coefficient and" with --k is a coefficient, and--.

Signed and Sealed this
Seventeenth Day of September, 2019

Andrei Iancu
*Director of the United States Patent and Trademark Office*